Figure 1:
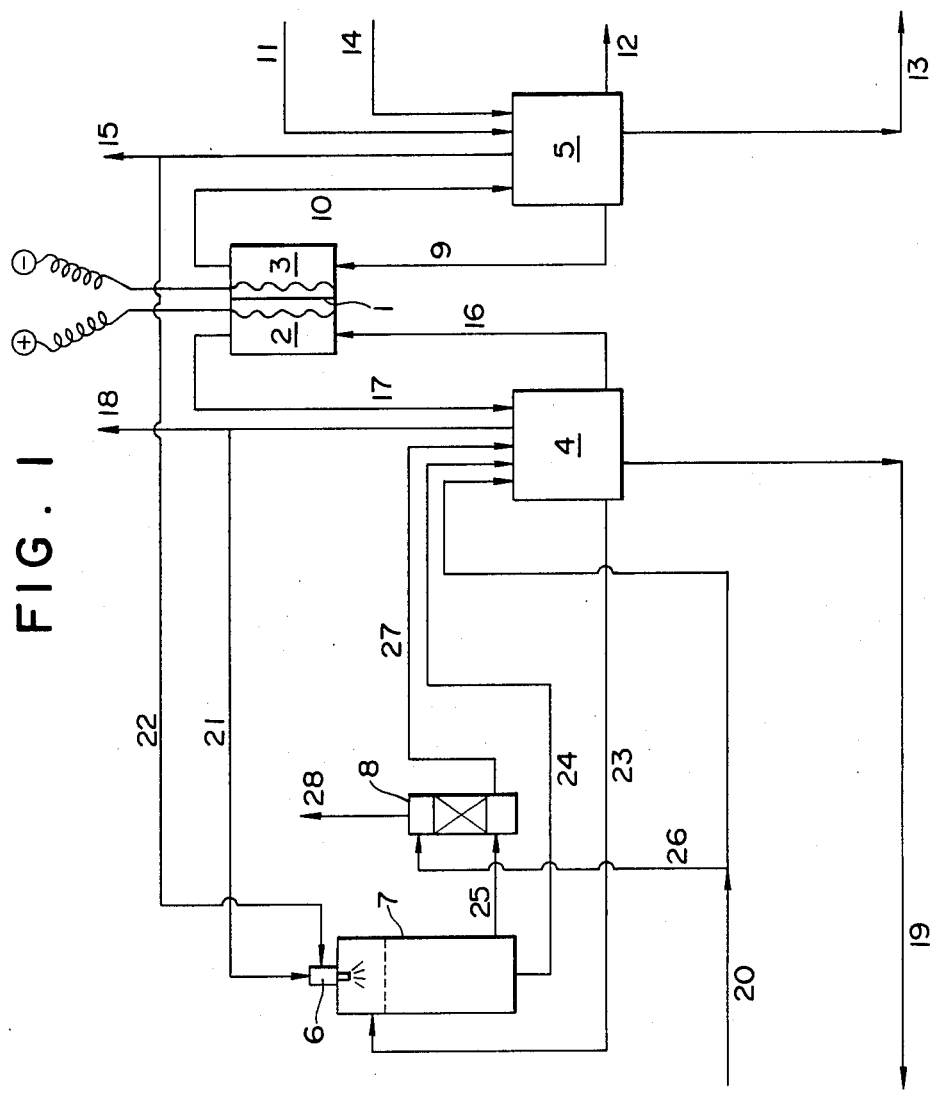

United States Patent [19]
Ogawa et al.

[11] 4,214,957
[45] Jul. 29, 1980

[54] SYSTEM FOR ELECTROLYSIS OF SODIUM CHLORIDE BY ION-EXCHANGE MEMBRANE PROCESS

[75] Inventors: Shinsaku Ogawa; Tsutomu Kanke, both of Nobeoka, Japan

[73] Assignee: Asahi Kasei Kogyo Kabushiki Kaisha, Osaka, Japan

[21] Appl. No.: 8,187

[22] Filed: Jan. 31, 1979

[30] Foreign Application Priority Data

Feb. 15, 1978 [JP] Japan .................................. 53-15383

[51] Int. Cl.$^2$ ........................... C01B 1/34; C01B 1/02
[52] U.S. Cl. ...................................... 204/98; 204/128; 204/129
[58] Field of Search .......................... 204/98, 128, 129

[56] References Cited

U.S. PATENT DOCUMENTS 3,627,479  12/1971  Yee .......................................... 204/98
4,090,932   5/1978  Kazihara et al. ...................... 204/98

Primary Examiner—R. L. Andrews
Attorney, Agent, or Firm—Birch, Stewart, Kolasch and Birch

[57] ABSTRACT

In a system for the electrolysis of sodium chloride in an electrolytic cell divided by a cation exchange membrane into the anode and cathode chambers, hydrogen chloride gas is synthesized from the chlorine gas and the hydrogen gas generated in said electrolytic cell, the hydrogen chloride gas synthesized is directly absorbed in the aqueous sodium chloride solution fed into the anode chamber to neutralize the hydroxyl ions in the anolyte migrated from the cathode chamber and the reaction heat as well as the absorption heat of the hydrogen chloride gas are also utilized for concentration of the dilute aqueous sodium chloride solution and/or the aqueous sodium hydroxide solution produced in the cathode chamber.

2 Claims, 2 Drawing Figures

SYSTEM FOR ELECTROLYSIS OF SODIUM CHLORIDE BY ION-EXCHANGE MEMBRANE PROCESS

This invention relates to a novel system for electrolysis of sodium chloride in an electrolytic cell divided by a cation exchange membrane between the anode and the cathode into the anode and cathode chambers by feeding an aqueous sodium chloride solution into said anode chamber to produce chlorine gas from the anode chamber and an aqueous sodium hydroxide solution and hydrogen gas from the cathode chamber, respectively, wherein the electrolysis is carried out while permitting the hydrogen chloride gas to be absorbed into the feed aqueous sodium chloride solution and/or the dilute aqueous sodium chloride solution.

When a cation exchange membrane is interposed between the anode and the cathode, the current passes ideally only through migration of the cations from the anode chamber to the cathode chamber. Practically, however, a small amount of anions are also migrated from the cathode chamber to the anode chamber. In particular, in electrolysis of sodium chloride by feeding an aqueous sodium chloride solution into the anode chamber to produce caustic soda from the cathode chamber, the hydroxyl ions present in the cathode chamber are highly migrational. Hence, while depending on the cation exchange membrane employed, the electricity in the order of 10% is transported by the hydroxyl ions, whereby the hydroxyl ions are migrated from the cathode chamber to the anode chamber. The hydroxyl ions migrated into the anode chamber are discharged on the anode to generate oxygen gas, which causes degradation in purity of the chlorine gas formed or reacts with the chlorine gas formed to generate chlorate. Such chlorate is accumulated in the anolyte, whereby the solubility of sodium chloride in the anolyte is lowered.

Therefore, in electrolysis of sodium chloride by use of a cation exchange membrane, a mineral acid such an aqueous hydrochloric acid solution has conventionally been added into the anode chamber in order to neutralize the hydroxyl ions migrated from the cathode chamber. It is thereby advantageous to employ a highly concentrated aqueous hydrochloric acid solution, for example, a 35 to 36% aqueous hydrochloric acid solution for the purpose of preventing lowering of the sodium chloride concentration in the anolyte and maintaining a high degree of decomposition of the feed aqueous sodium chloride solution. According to the methods of prior art, there has been employed commercially available by-produced hydrochloric acid or synthetic hydrochloric acid. Alternatively, by providing an equipment for synthesis of hydrochloric acid, 35% aqueous hydrochloric acid solution is synthesized from the chlorine gas formed in the anode chamber and the hydrogen gas by-produced in the cathode chamber, which solution is provided for use. However, when commercially available hydrochloric acid is used, proportional production cost is increased; while the equipment for synthesis of 35% aqueous hydrochloric acid solution is a considerably complicated equipment to increase construction cost, whereby utility costs such as of cooling water are also increased.

The present invention provides a system for electrolysis of sodium chloride in an electrolytic cell divided by a cation exchange membrane between the anode and the cathode into the anode and cathode chambers by feeding an aqueous sodium chloride solution into said anode chamber, wherein the following steps are combined:

(1) hydrogen chloride gas is synthesized from the chlorine gas and the hydrogen gas generated in said electrolytic cell;

(2) the hydrogen chloride gas thus synthesized is absorbed into the feed aqueous sodium chloride solution and/or the dilute aqueous sodium chloride solution so as to control the hydrochloric acid concentration in the absorbing solution at 0.1 to 20 wt.%; and (3) concentration of the dilute aqueous sodium chloride solution and/or the aqueous sodium hydroxide solution produced in the cathode chamber is effected by utilizing the reaction heat and the absorption heat of the hydrogen chloride gas and the heat generated from the electrolytic cell.

Figure 2:
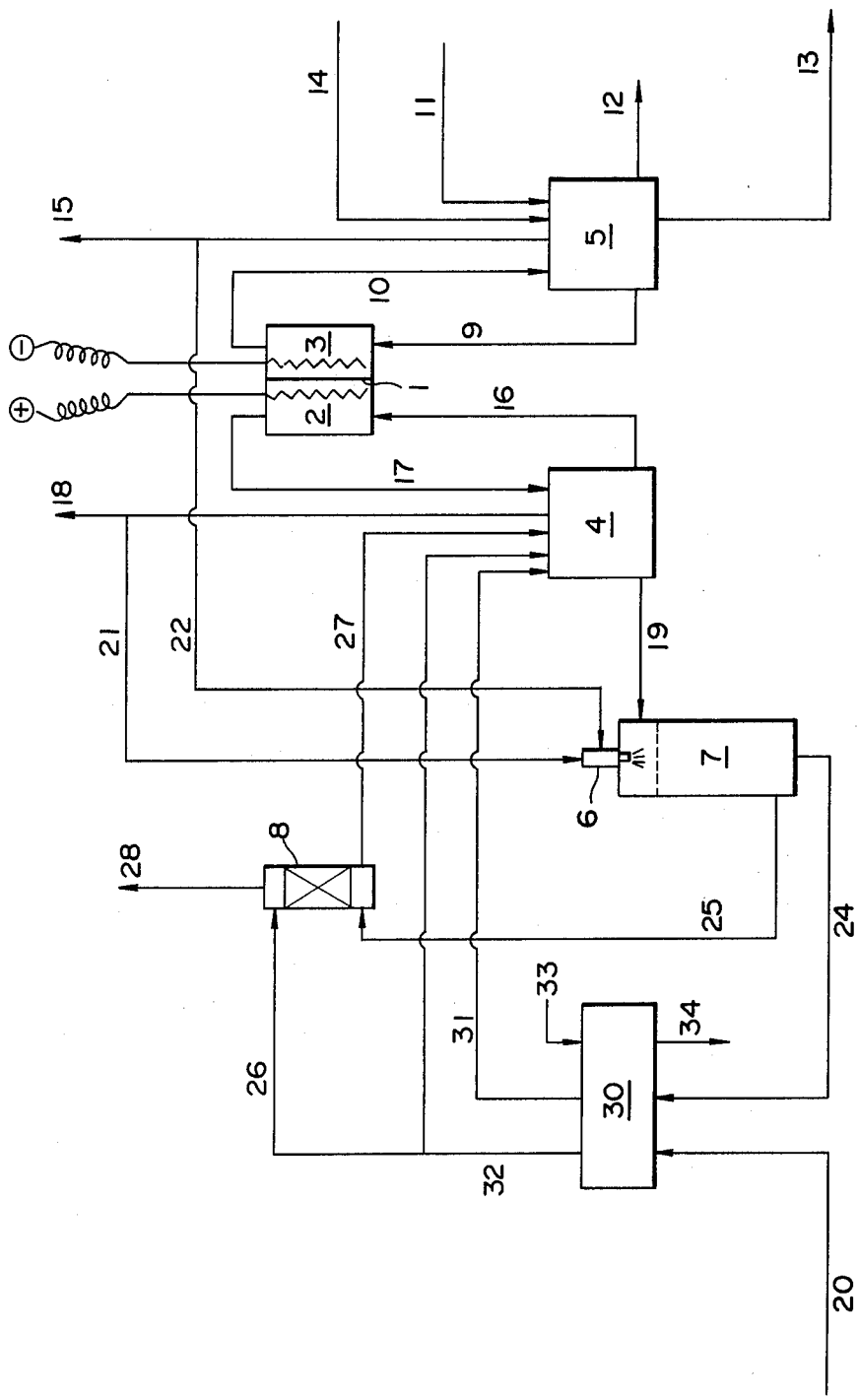

In the accompanying drawings, FIG. 1 and FIG. 2 show typical flow sheets for practicing the process of the present invention.

The specific feature of the present invention resides in permitting hydrogen chloride gas to be absorbed directly into the feed aqueous sodium chloride solution and/or the dilute aqueous sodium chloride solution in order to neutralize the hydroxyl ions migrated from the cathode chamber to the anode chamber.

The dilute aqueous sodium chloride solution mentioned in the present invention refers to the aqueous sodium chloride solution depleted in sodium chloride concentration after being subjected to electrolysis in the anode chamber or the aqueous sodium chloride solution depleted in sodium chloride concentration which is circulated between the anode chamber and the anolyte circulation tank.

In case of the ion-exchange membrane process, it is advantageous to effect concentration of the dilute sodium chloride solution in order to increase the efficiency of the feed sodium chloride utilized. In particular, when well brine is used as the starting sodium chloride, it is preferred to effect concentration of the dilute sodium chloride solution. In some cases, it is also required to further concentrate the aqueous caustic soda solution produced from the cathode chamber. In such a case, the concentration system utilizing the heat generated in the electrolytic cell, as proposed by Japanese patent application No. 128857/1975 and Japanese patent application No. 151663/1977, is very advantageous. In the present invention, there is also combined such a concentration system to exhibit excellent effect.

That is, both synthesis and absorption of hydrogen chloride gas are exothermic reactions; during the synthesis procedure, it releases 22 Kcal/mol of reaction heat, while during absorption procedure 15 to 17 Kcal/mol of absorption heat. When it is desired to produce an aqueous hydrochloric acid solution of 20% or higher, partial pressure of hydrogen chloride gas in the aqueous hydrochloric acid solution is increased with elevation of the temperature, whereby the hydrogen chloride gas becomes poorly absorbed. Therefore, the solution is required to be maintained at a lower temperature and for this purpose cooling with a large amount of cooling water is necessary. Consequently, the reaction heat and absorption heat are carried away with the cooling water. According to the present system, this heat is returned to the anolyte and utilized effectively for concentration of the dilute aqueous sodium chloride solution or the aqueous caustic soda solution.

The hydrogen chloride gas may be absorbed either into the feed aqueous sodium chloride solution or into the dilute aqueous sodium chloride solution. In case of the feed aqueous sodium chloride solution, which is as high as 300 to 310 g/liter in concentration, sufficient care should be taken about the precipitation of sodium chloride in the absorption device. Absorption in the dilute aqueous sodium chloride solution is more advantageous, since there is no fear of precipitation of sodium chloride on account of its relatively lower concentration of 100 to 250 g/liter.

The hydrochloric acid concentration after absorption is required to be 0.1 to 20 wt.%. When it is over 20%, partial pressure of hydrogen chloride gas after absorption in the aqueous sodium chloride solution is increased, whereby it is necessary to lower the temperature of the aqueous sodium chloride solution and cooling water is required to be disadvantageously used. On the other hand, with a low concentration of 0.1% or less, a large amount of the aqueous sodium chloride solution is required to be circulated, whereby absorption equipment is required to be disadvantageously large.

The temperature of the absorbed aqueous sodium chloride may vary widely in the range from 30° to 100° C. As the absorption equipment to be used in the present invention, there may be employed any of the conventionally used gas absorption devices such as a packed tower, a perforated plate tower, a wetted wall tower, a spray tower, a jet scrubber, a venturi scrubber, and the like. Synthesis of hydrogen chloride gas from chlorine gas and hydrogen gas generated from the electrolytic cell may be performed according to any one of the combustion method utilizing a burner, the ultra-violet ray irradiation method and the catalytic method. Furthermore, synthesis and absorption may be conducted simultaneously according to the combustion-in-liquid method.

The cation exchange membrane to be used in the present invention is not specifically limited, but any cation exchange membrane may be available so far as it is resistant to chlorine gas generated in the anode chamber and has a large transport number of sodium ions. From the standpoint of resistance to chloride, a fluorocarbon type cation exchange membrane is preferably used. As the ion-exchange groups, there may be used any cation exchange group conventionally used without limitation such as sulfonic acid groups, carboxylic acid groups, phosphoric acid groups, sulfonamide groups, hydroxyl groups, etc. It is preferred to use a membrane having weakly acidic groups, present at least on the cathode side of the membrane, such as carboxylic acid groups, phosphoric acid groups or sulfonamide groups, since such a membrane has a large number of transport sodium ions.

The electrolysis temperature may vary from 50° to 120° C., preferably from 60° to 100° C. When the electrolysis temperature is too low, electric resistance is increased to increase the cell voltage. On the contrary, when it is too high, there may occur the boiling phenomenon to increase the cell voltage. In particular, when hydrogen chloride gas is absorbed into the dilute aqueous sodium chloride solution, the temperature elevation occurs in the absorption step and therefore the electrolysis temperature is preferably from 60° to 90° C. When the electrolysis temperature is desired to be maintained at a high temperature, hydrogen chloride gas may advantageously be absorbed in the feed aqueous sodium chloride solution or in the recovered concentrated aqueous sodium chloride solution which is lowered to a lower temperature after concentration of the dilute aqueous sodium chloride solution.

The present invention may be better understood with reference to the drawings showing typical embodiments of the present invention, which are set forth for only illustrative purpose and not by way of restriction.

In FIG. 1, 1 shows a cation exchange membrane, 2 the anode chamber of an electrolytic cell, 3 the cathode chamber of an electrolytic cell, 4 the anolyte circulation tank, 5 the catholyte circulation tank, 6 the combustion nozzle, 7 the absorption tower, 8 the waste gas washing tower.

There is formed the circulation line by the lines 9 and 10 between the cathode chamber 3 and the catholyte circulation tank 5. The aqueous caustic soda solution controlled to a certain concentration by addition of water from the line 11 as desired is circulated between the cathode chamber 3 of the electrolytic cell and the catholyte circulation tank 5. From the line 12, the aqueous caustic soda produced is withdrawn and conveyed to an equipment for concentration of the aqueous caustic soda solution, which is not shown. From the line 13, a part of the catholyte is withdrawn and conveyed to the concentration equipment, wherein it is utilized as heat source for heating the aqueous caustic soda solution produced, and thereafter returned to the catholyte circulation tank 5 through the line 14. The hydrogen gas generated is withdrawn from the line 15 after gas-liquid separation in the catholyte circulation tank 5. The line 11 may be connected to the line 9. In this case, a more concentrated aqueous caustic soda solution is withdrawn from the line 12.

The lines 16 and 17 are circulation lines between the anode chamber 2 and the anolyte circulation tank 4. From the line 18 is withdrawn the chlorine gas generated after gas-liquid separation in the anolyte circulation tank 4. A part of the dilute aqueous sodium chloride solution is withdrawn from the line 19 and conveyed to the sodium chloride dissolving tower, which is not shown. After removal of impurities in the purification step from the substantially saturated aqueous sodium chloride solution after dissolving sodium chloride, it is returned through the line 20 as the feed aqueous sodium chloride solution to the anolyte circulation tank 4.

From the line 21 is withdrawn a part of the chlorine gas generated, while from the line 22 a part of the hydrogen gas generated, and both are delivered to the combustion nozzle 6, wherein hydrogen chloride gas is synthesized. The synthesized hydrogen chloride gas is absorbed in absorption tower 7 by the dilute aqueous sodium chloride solution conveyed through the line 23. The aqueous sodium chloride solution increased in acidity and temperature after absorption of the hydrogen chloride gas is returned through the line 24 to the anolyte circulation tank to neutralize the hydroxyl ions migrated from the cathode chamber therein. On the other hand, the reaction heat and the absorption heat of the hydrogen chloride recovered in the anolyte are transmitted to the catholyte in the electrolytic cell and utilized for concentration of the aqueous caustic soda solution. The waste gas after absorption is conveyed through the line 25 to the waste gas washing tower 8, wherein the residual hydrogen chloride gas and chlorine gas are absorbed by the feed aqueous sodium chloride solution conveyed through the line 26, followed by cooling, and discharged from the line 28. The line 24 may be connected to the line 16. In such a case, the acid concentration in the dilute aqueous sodium chloride solutions withdrawn from the line 19 and the line 23 is advantageously lowered. The combustion nozzle 6 and the absorption tower 7 may be provided on the line 16, or alternatively on the line 20 so as to absorb the hydrogen chloride gas by the feed aqueous sodium chloride solution.

FIG. 2 shows one example wherein concentration of the dilute aqueous sodium chloride solution is combined. The numerals in FIG. 2 correspond to those in FIG. 1. The multi-stage flash evaporator is indicated by 30. The electrolysis system is the same as in FIG. 1.

The dilute aqueous sodium chloride solution withdrawn from the line 19 is conveyed to the hydrogen chloride gas absorption tower 7. After absorption of the hydrogen chloride gas synthesized from the chlorine gas conveyed through the line 21 and the hydrogen gas conveyed through the line 22, said solution is conveyed through the line 24 to the multi-stage flash evaporator 30. The combustion heat and the absorption heat of the hydrogen chloride gas bring about temperature elevation of the dilute aqueous sodium chloride solution and are effectively utilized when the dilute aqueous sodium chloride solution is concentrated in the multi-stage flash evaporator. The dilute aqueous sodium chloride solution concentrated in the multi-stage flash evaporator 30 is returned as the concentrated aqueous sodium chloride solution through the line 31 to the anolyte circulation tank 4.

Boiler steam is indicated by 33 and used as heat source for the multi-stage flash evaporator 30, and the line for withdrawal of the condensed water is indicated by 34.

The feed aqueous sodium chloride solution, after being removed of calcium, magnesium, iron, etc. in the purification step (not shown), is conveyed to the multi-stage flash evaporator 30 through the line 20 to be utilized as cooling source, and then conveyed through the line 32 to the anolyte circulation tank 4. Furthermore, a part of the feed aqueous sodium chloride solution is conveyed through the line 26 to the waste gas washing tower 8, wherein it cools the waste gas conveyed through the line 25 from the hydrogen chloride absorption tower 7 and absorbs residual hydrogen chloride gas and chlorine gas, and thereafter is conveyed through the line 27 to the anolyte circulation tank 4.

The hydrogen chloride absorption tower 7 may be provided in the course of the line 31 in order to utilize the combustion heat and the absorption heat of the hydrogen chloride gas for temperature elevation of the cooled concentrated aqueous sodium chloride solution in the multi-stage flash evaporator 30.

The following advantages are brought about by the system according to the present invention:

(a) When an aqueous hydrochloric acid solution is added to the anolyte in the process of prior art, water is accompanied with the hydrochloric acid. In the present invention, the aqueous sodium chloride solution is prevented from being diluted with addition of such water, whereby the percentage of the sodium chloride decomposed can be maintained higher.

(b) According to the present invention, synthesis and absorption of hydrogen chloride gas can be effected by means of a comparatively simple equipment. In conventional tower for synthesis of hydrochloric acid, it is usual to provide a highly concentrated aqueous hydrochloric acid solution of about 35%. In contrast, in the present invention, it is only required to absorb hydrogen chloride gas into a large amount of the aqueous sodium chloride solution, thereby providing an aqueous hydrochloric acid solution with a low concentration of 10% or less. Accordingly, the partial hydrogen chloride gas pressure in the absorbed liquid can be smaller, whereby only less expensive and simple equipment is necessary as compared with a conventional tower for the synthesis of hydrochloric acid.

(c) In conventional tower for synthesis of hydrochloric acid, it is usual practice to operate the tower under the condition of hydrogen excess, while in the present invention an operation under an excessive amount of chlorine gas (namely 1.01 to 5 times as much as the theoretical amount) is possible. That is, even when an excessive amount of chlorine gas may be absorbed in the aqueous sodium chloride solution, it is introduced into the anode chamber, thereby causing no harmful effect. Thus, the percentage of the hydrogen gas utilized is increased and the operation control is easier. Further, by combustion of the hydrogen gas in an excessive amount of chlorine gas, the temperature of the flame can be lowered to enable elongation of the life of the equipment.

(d) According to the present invention, the temperature of the aqueous sodium chloride solution in which hydrogen chloride gas is absorbed is increased by the combustion heat and the absorption heat, whereby chlorate accumulated in the aqueous sodium chloride solution can be decomposed.

(e) In the present invention, the reaction heat and the absorption heat generated at the time of synthesis and absorption of the hydrogen chloride gas can effectively be utilized.

The present invention is explained in more detail with reference to the following Examples.

"Ton" in the following Examples means metric ton.

EXAMPLE 1

Electrolysis of sodium chloride is carried out according to the flow sheet as shown in FIG. 1. As the cation exchange membrane, there is employed a membrane comprising a base of fluorocarbon resin substrate having pendant sulfonic acid groups and having only on the cathode side of the membrane carboxylic acid groups.

In a bipolar electrolyzer divided into the anode and cathode chambers by said cation exchange membranes, electrolysis is carried out at the current density of 40 $A/dm^2$. An aqueous 25.5 wt.% sodium chloride solution is fed at the rate of 71.8 tons/hour (T/H) through the line 20 and the sodium chloride concentration in the circulated anolyte is maintained at 14.4 wt.%. Water is added through the line 11 at the rate of 16.1 T/H, and an aqueous 21.6 wt.% sodium hydroxide solution is withdrawn through the line 12 at the rate of 39.5 T/H. The current efficiency for formation of the caustic soda is found to be 93% and the cell voltage 3.75 volt.

Through the line 23 is conveyed the dilute aqueous sodium chloride solution of pH 3 and the temperature of 88° C. at the rate of 162.4 T/H into the hydrogen chloride absorption tower 7, wherein the hydrogen chloride gas is absorbed at the rate of 0.6 T/H, and the resultant aqueous sodium chloride solution increased to acid concentration of 0.37% and to the temperature 93° C. is returned to the anolyte circulation tank. Also, by providing separating plates in the anolyte circulation tank, the dilute aqueous sodium chloride solution withdrawn from the lines 19 and 23 are prevented from mixing with the aqueous sodium chloride solutions returned from the lines 20, 24 and 27.

The circulated anolyte and the circulated catholyte are maintained at 88° C. and 87.5° C., respectively, by utilizing a part of the circulated catholyte as heat source for the equipment for concentration of the caustic soda.

As the result of continuous operation under these conditions for three months, the oxygen concentration in the chlorine gas is found to be 0.5% on an average and there is no increase in concentration of chlorate in the aqueous sodium chloride solution. The quantity of steam necessary for concentration of the aqueous sodium hydroxide solution from 21.6% to 48% is reduced by 0.15 ton per one ton of pure caustic soda produced, as compared with the operation when the acid concentration is controlled with an aqueous hydrochloric acid solution.

EXAMPLE 2

Electrolysis of sodium chloride is conducted according to the flow sheet as shown in FIG. 2. The cation exchange membranes and the electrolytic cell employed are the same as in Example 1. The electrolysis is carried out at the current density of 40 A/dm$^2$, an aqueous 25.5 wt.% sodium chloride solution is fed through the line 20 at 49.0 T/H and water through the line 11 at 16.1 T/H, and an aqueous 21.6 wt.% caustic soda solution is withdrawn through the line 12 at 39.5 T/H. The current efficiency for formation of caustic soda is found to be 93% and the cell voltage 3.75 volt.

From the line 19, the dilute aqueous sodium chloride solution with sodium chloride concentration of 14.3 wt.%, pH 3 and the temperature of 87° C. is conveyed at 132.1 T/H to the hydrogen chloride absorption tower 7, wherein it absorbs hydrogen chloride gas at 0.6 T/H to be increased to a hydrochloric acid concentration of 0.45 wt.% and elevated to a temperature of 92.4° C. This dilute aqueous sodium chloride solution is conveyed through the line 24 to the multi-stage flash evaporator 30.

In the multi-stage flash evaporator 30, water is evaporated at 17.7 T/H, and the concentrated aqueous sodium chloride solution concentrated to a sodium chloride concentration of 16.5 wt.% and a hydrochloric acid concentration of 0.52 wt.% and cooled to a temperature of 84.7° C. is returned at 115 T/H through the line 31 to the anolyte circulation tank 4, whereby the sodium chloride concentration is maintained at 14.3 wt.%.

As the result of continuous operation under these conditions for three months, the oxygen gas concentration in the chlorine gas is found to be 0.5% on an average and there is no increase in concentration of chlorate in the aqueous sodium chloride solution. The quantity of the steam used for concentration of the dilute aqueous sodium chloride solution is reduced by 0.11 ton per one tone of pure cuastic soda produced, as compared with the operation when the acid concentration is controlled with an aqueous hydrochloric acid solution.

What we claim is:

1. A method for the electrolysis of sodium chloride in an electrolytic cell divided by a cation exchange membrane into an anode chamber and a cathode chamber wherein an aqueous sodium chloride solution is introduced into said anode chamber, which comprises
   (1) synthesizing hydrogen chloride gas from the chloride gas and the hydrogen gas generated in said electrolytic cell, utilizing an excessive amount of chlorine gas;
   (2) absorbing the hydrogen chloride gas thus synthesized and the excess chlorine gas into the feed aqueous sodium chloride solution and/or the dilute aqueous sodium chloride solution, thereby dissolving the chlorine gas therein and controlling the hydrochloric acid concentration in the absorbing solution at 0.1 to 20 wt.%; and
   (3) concentrating the dilute aqueous sodium chloride solution and/or the aqueous sodium hydroxide solution produced in the cathode chamber by utilizing the reaction heat and the absorption heat of the hydrogen chloride gas and the heat generated from the electrolytic cell.

2. The method according to claim 1, wherein the excess amount of chlorine gas is absorbed into the feed aqueous sodium chloride solution.

* * * * *